United States Patent
Bryer et al.

(10) Patent No.: US 9,156,416 B2
(45) Date of Patent: Oct. 13, 2015

(54) ENERGY ABSORBING VEHICLE COMPONENT

(71) Applicant: GM Global Technology Operations LLC, Detroit, MI (US)

(72) Inventors: Giles D. Bryer, Northville, MI (US); Robert N. Saje, Shelby Township, MI (US); John C. Johnson, Macomb Township, MI (US); Bryan F. Lake, Macomb, MI (US); Edward D. Moss, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/307,614

(22) Filed: Jun. 18, 2014

(65) Prior Publication Data

US 2015/0021938 A1    Jan. 22, 2015

Related U.S. Application Data

(60) Provisional application No. 61/857,062, filed on Jul. 22, 2013.

(51) Int. Cl.
| | |
|---|---|
| B60R 19/26 | (2006.01) |
| B60R 19/18 | (2006.01) |
| B60R 19/34 | (2006.01) |
| B60R 19/24 | (2006.01) |

(52) U.S. Cl.
CPC ............. *B60R 19/18* (2013.01); *B60R 19/26* (2013.01); *B60R 19/34* (2013.01); *B60R 2019/186* (2013.01); *B60R 2019/242* (2013.01)

(58) Field of Classification Search
CPC ........ B60R 19/34; B60R 19/26; B60R 19/18; B60R 2019/186; B60R 2019/242
See application file for complete search history.

(56) References Cited

U.S. PATENT DOCUMENTS

| | | | |
|---|---|---|---|
| 2012/0104778 A1* | 5/2012 | Mana et al. | 293/133 |
| 2013/0113226 A1* | 5/2013 | Bobba et al. | 293/133 |

* cited by examiner

*Primary Examiner* — Lori L Lyjak
(74) *Attorney, Agent, or Firm* — BrooksGroup

(57) ABSTRACT

A number of variations may include a product including an energy absorbing component for a vehicle comprising at least one of a crush can, an insert for a cross car beam or a front impact extension.

15 Claims, 3 Drawing Sheets

ENERGY ABSORBING VEHICLE COMPONENT

CROSS-REFERENCE TO RELATED APPLICATIONS

This application claims the benefit of U.S. Provisional Application No. 61/857,062 filed Jul. 22, 2013.

TECHNICAL FIELD

The field to which the disclosure generally relates to includes energy absorbing components for vehicles.

BACKGROUND

Vehicles may be equipped with one or more components for absorbing energy.

SUMMARY OF ILLUSTRATIVE VARIATIONS

A number of variations may include a front energy absorbing insert which may be constructed and arranged to be received in a pocket or opening of the cross car beam.

A number of variations may include a product including an energy absorbing component for a vehicle comprising at least one of a crush can, an insert for a cross car beam or a front impact extension.

In a number of variations the energy absorbing component for a vehicle may be an extrusion, and may be a single piece of continuous non-joined extruded metal.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
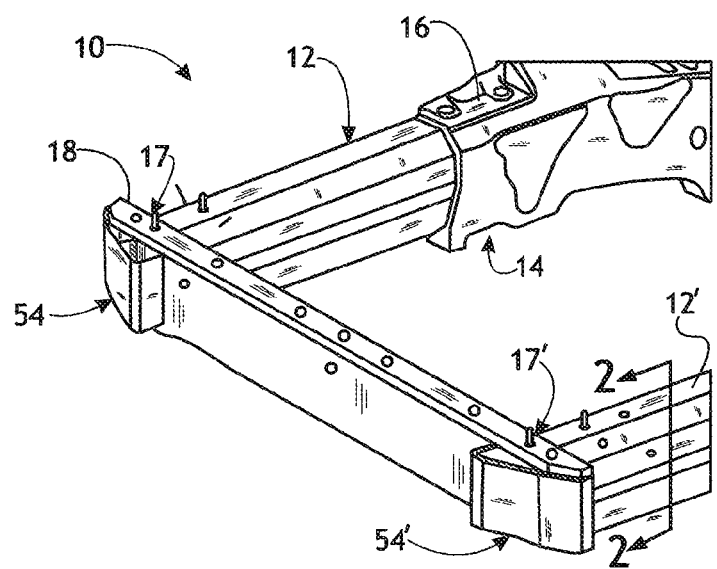
FIG. 1 is a perspective view of a portion of a vehicle including an energy absorbing component according to a number of variations.

A number of variations are illustrated in FIG. 1 and may include a product 10 including an energy absorbing component for a vehicle. In a number of variations, the energy absorbing component for a vehicle may include a vehicle crush can 12 which may be attached to or connected to a vehicle rail system 14. In a number of variations, the crush can 12 may be connected to the vehicle rail system by a joint structure 16 having a recess formed therein for receiving a portion of the crush can 12. One end 17 of the crush can 12 may be connected to a cross car beam 18 such as a bumper. A similar second opposite crush can 12' may also be connected to the rail system 14 and one end 17' of the second crush can 12' may be connected to the cross car beam 18. A front energy absorbing insert 56 (best seen in FIG. 3) may be received in the cross car beam 18 and aligned with the crush can 12. A second front energy absorbing insert 56' may be received in the cross car beam 18 and aligned with the second crush can 12'. A first front impact extension 54 may be attached to the cross car beam 18 and aligned with the first crush can 12. A second front impact extension 54' may be attached to the cross car beam 18 and aligned with the second crush can 12'.

Figure 2:
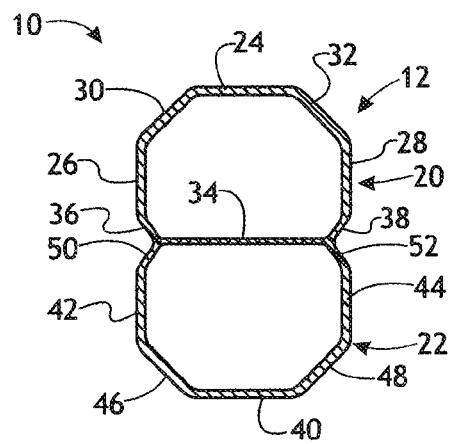
FIG. 2 is a cross-section taken along line 2-2 of FIG. 1 illustrating a crush can according to a number of variations of the invention.

Referring now to FIG. 2, the crush can 12, 12' may each include a top portion 20 having a plurality of walls arranged in an octagon shape. A bottom rail portion 22 may include a plurality of walls arranged in an octagon shape. For example, the top rail portion 20 may include a top wall portion 24 and an opposite middle wall portion 34. A first side wall 26 may be provided and spaced from an opposite second side wall 28. A first angled wall portion 30 may join the first side wall 26 and the top wall 24, and a second angled side wall portion 32 may join the second side wall portion 28 and the top wall portion 24. A third angled wall portion 36 may join the first side wall portion 26 and the middle wall portion 34, and a fourth angled wall portion 38 may join the second side wall portion 28 and the middle side wall portion 34.

The bottom rail portion 22 may include a bottom wall portion 40 positioned opposite the middle wall portion 34. A third side wall portion 42 may be provided along with a spaced apart opposite fourth side wall portion 44. A fifth angled wall portion 46 may join the bottom wall portion 40 and the third side wall portion 42 and a sixth angled wall portion 48 may join the bottom wall portion 40 and the fourth side wall portion 44. A seventh angled wall portion 50 may join the third side wall portion 42 and the middle wall portion 34, and an eighth angled wall portion 52 may join the fourth side wall portion 44 and the middle wall portion 34. In a number of variations, the top wall portion 24, middle wall portion 34 and bottom wall portion 40 may be straight and parallel to each other. In a number of variations, the first side wall portion 26, second side wall portion 28, third side wall portion 42 and fourth side wall portion 44 may be straight and parallel to each other. In a number of variations, the first side wall portion 26 and the third side wall 42 portion may be straight and in the same line. In a number of variations, the second side wall portion 28 and the fourth side wall portion 44 may be straight and in the same line.

Figure 3:
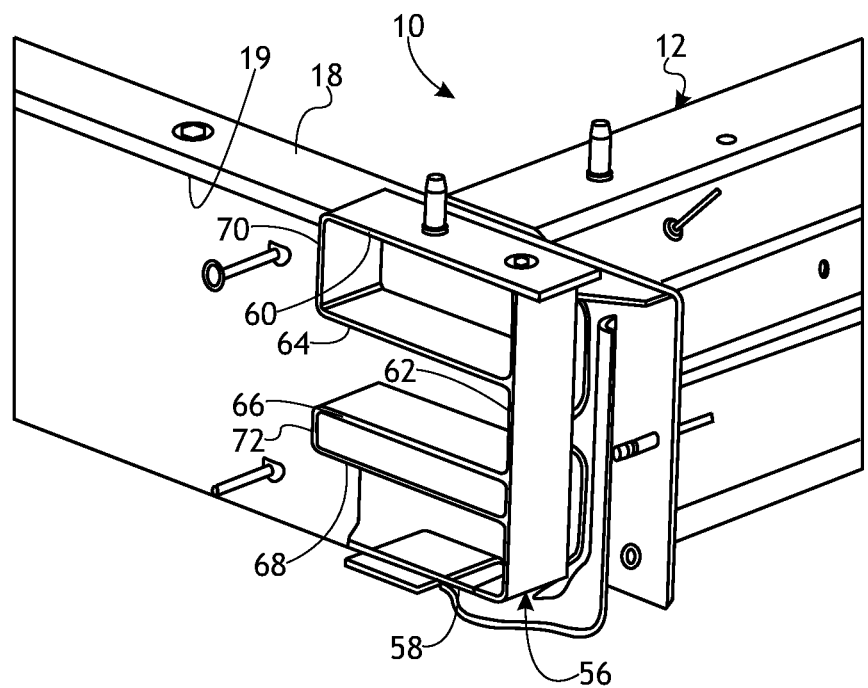
FIG. 3 is a perspective view with portions removed illustrating a front energy absorbing insert according to a number of variations.

Referring now to FIG. 3, a number of variations may include a front energy absorbing insert 56, 56' which may be received in a pocket or opening 19 of the cross car beam 18. The front energy absorbing insert 56 may include a bottom wall 58, an opposite top wall 60, and a first side wall 62 extending between the top wall 60 and bottom wall 58. Spaced apart first middle horizontal wall 64, second middle horizontal wall 66 and third middle horizontal wall 68 may be provided and may be connected to the first side wall 62. A first end wall 70 may be provided joining the top wall 60 and the first middle horizontal wall 64. A second end wall 72 may be provided joining the second middle horizontal wall 66 and a third middle horizontal wall 68. In a number of variations, the first side wall 62 may be aligned with the second side wall 28 and fourth side wall 44 of the crush can 12'. The top wall 60 may be aligned with the top wall 24 of the crush can 12' and the bottom wall 54 may be aligned with the bottom wall 40 of the crush can 12'. The end wall 70 may be aligned with a portion of the first side wall 26 of the crush can 12, and the second end wall 72 may be aligned with a portion of the third side wall 42 of the crush can 12.

Figure 4:
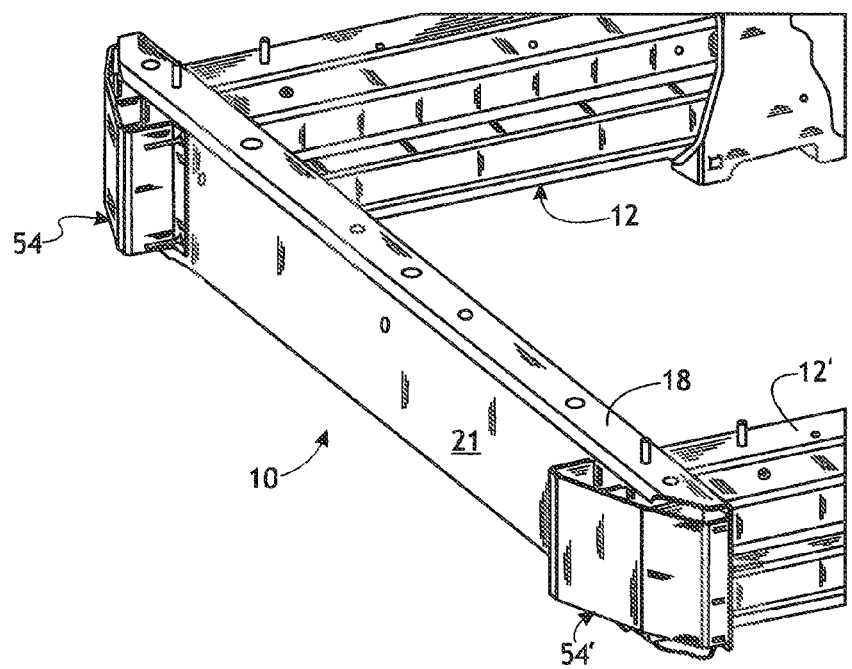
FIG. 4 is a perspective view illustrating a front impact extension according to a number of variations.
Figure 5:
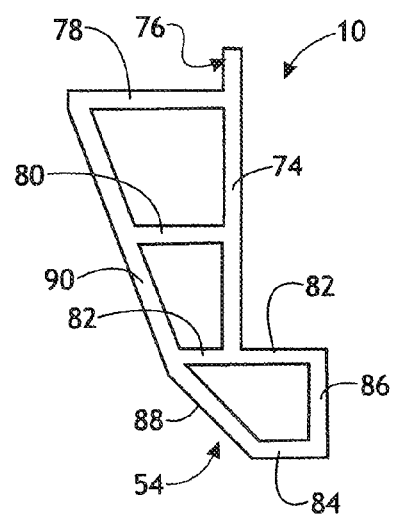
FIG. 5 is an illustration, in plan view, of a front impact extension according to a number of variations.

Referring now to FIG. 4, a first front impact extension 54 may be attached to the cross car being near one end thereof and a second front impact extension 54' may be connected to the cross car beam 18 near a second end thereof. The first front impact extension 54 and second front impact extension 54' may be constructed and arranged to include a first base wall 74 extending along a front face 21 of the cross car beam 18. The first base wall may provide a flange portion 76 extending inboard from a first crush wall 78 extending perpendicular from the first base wall 74. A second crush wall 80 may be spaced apart from the first crush wall 78 and may extend perpendicularly from the first base wall 74. A third crush wall 82 may extend from the first base wall 74 in the perpendicular direction. A portion of the third crush wall 82 may extend rearward from the first base wall 74 and may connect to a second base wall 76. The second base wall 76 may be parallel to the first base wall 74. A fourth crush wall 84 may extend perpendicularly from the second base wall 86. A first engagement wall 88 may extend from the fourth crush wall 84 generally to the third crush wall 82. A second engagement wall 90 may extend from the third crush wall 82 to the first crush wall 78 connecting to the second crush wall 80. In a number of variations, the first crush wall 78 may be aligned with the first side wall 26 and third side wall 40 of the crush can 12'. In a number of variations, the third crush wall 82 may be aligned with the second side wall 28 and the fourth side wall 44 of the crush can 12'.

When the crush can 12 or 12', front energy absorbing insert 56 or 56' and front impact extension 54 or 54' are provided and aligned respectively in a vehicle, the energy absorbing components increase the front crush length without lengthening the overall vehicle. In a number of variations, the front impact extensions 54, 54' may be used to replace high density foam energy absorbers. In a number of variations, each of the crush can 12, 12', front impact extensions 54, 54', front energy absorbing insert 56, 56' may each be made from an extruded metal, including but not limited to, aluminum or an aluminum alloy, and wherein each may be a single piece of continuous non-joined metal extrusion.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a front energy absorbing insert constructed and arranged to be received in a pocket or opening of a cross car beam, the front energy absorbing insert comprising a bottom wall and opposite top wall, and a first side wall extending between the top wall and the bottom wall.

Variation 2 may include a product as set forth in Variation 1 and further comprising a first middle horizontal wall connected to the first side wall.

Variation 3 may include a product as set forth in any of Variations 1-2 and further comprising a second middle horizontal wall connected to the first side wall.

Variation 4 may include a product as set forth in any of Variations 1-3 and further comprising a third middle horizontal wall connected to the first side wall.

Variation 5 may include a product as set forth in any of Variations 1-4 and further comprising a first end wall connected to the top wall and the first middle horizontal wall.

Variation 6 may include a product as set forth in any of Variations 1-5 and further comprising a second end wall connected to the second middle horizontal wall and the third middle horizontal wall.

Variation 7 may include a product as set forth in any of Variations 1-6 and further comprising a first end wall connected to the top wall in the first middle horizontal wall, and a second end wall connected to the second middle horizontal wall and the third middle horizontal wall.

Variation 8 may include a product as set forth in any of Variations 1-7 and further comprising a cross car beam, and wherein the cross car beam includes a pocket or opening, and wherein the front energy absorbing insert is received in the pocket or opening of the cross car beam.

Variation 9 may include a product as set forth in any of Variations 1-8 and further comprising a vehicle crush can having a first side wall and an opposite second side wall and wherein the first side wall of the front energy absorbing insert is aligned with the first side wall of the crush can, and wherein the first end wall is aligned with the second side wall of the crush can.

Variation 10 may include a product as set forth in any of Variations 1-9 and further comprising a vehicle crush can connected to a cross car beam, the cross car beam having a pocket or opening, and wherein the front energy absorbing insert is received in the pocket or opening of the cross car beam, the crush can having a first side wall and an opposite second side wall, and wherein the second end wall is aligned with the second side wall and wherein the first side wall of the front energy absorbing insert is aligned with the first side wall of the crush can.

Variation 11 may include a product as set forth in any of Variations 1-10 further comprising a cross car beam having a pocket or opening form therein, wherein the front energy absorbing insert is received in the pocket or opening, and further comprising a vehicle crush can including a top wall and a bottom wall, and wherein the top wall of the front energy absorbing insert is aligned with top wall of the crush can, and wherein the bottom wall of the front energy absorbing insert is aligned with the bottom wall of the crush can.

Variation 12 may include a product as set forth in any of Variations 1-11 wherein the front energy absorbing insert is a single piece of continuous non-joined metal.

Variation 13 may include a product as set forth in any of Variations 1-12 wherein the front energy absorbing insert comprises an extrusion.

Variation 14 may include a product as set forth in any of Variations 1-13 wherein the front energy absorbing insert comprises an extruded aluminum alloy.

Variation 15 may include a product as set forth in any of Variations 1-14 further comprising a front impact extension comprising an extrude metal and having a crushable wall align with the first side wall of the front energy absorbing insert.

The above description of select variations within the scope of the invention is merely illustrative in nature and, thus, variations or variants thereof are not to be regarded as a departure from the spirit and scope of the invention.

What is claimed is:

1. A product comprising:
a front energy absorbing insert constructed and arranged to be received in a pocket or opening of a cross car beam, the front energy absorbing insert comprising a bottom wall and opposite top wall, and a first side wall extending between the top wall and the bottom wall.

2. A product as set forth in claim 1 further comprising a first middle horizontal wall connected to the first side wall.

3. A product as set forth in claim 2 further comprising a second middle horizontal wall connected to the first side wall.

4. A product as set forth in claim 3 further comprising a third middle horizontal wall connected to the first side wall.

5. A product as set forth in claim 2 further comprising a first end wall connected to the top wall and the first middle horizontal wall.

6. A product as set forth in claim 4 further comprising a second end wall connected to the second middle horizontal wall and the third middle horizontal wall.

7. A product as set forth in claim 4 further comprising a first end wall connected to the top wall in the first middle horizontal wall, and a second end wall connected to the second middle horizontal wall and the third middle horizontal wall.

8. A product as set forth in claim 1 further comprising a cross car beam, and wherein the cross car beam includes a pocket or opening, and wherein the front energy absorbing insert is received in the pocket or opening of the cross car beam.

9. A product as set forth in claim 5 further comprising a vehicle crush can having a first side wall and an opposite second side wall and wherein the first side wall of the front energy absorbing insert is aligned with the first side wall of the crush can, and wherein the first end wall is aligned with the second side wall of the crush can.

10. A product as set forth in claim 6 further comprising a vehicle crush can connected to a cross car beam, the cross car beam having a pocket or opening, and wherein the front energy absorbing insert is received in the pocket or opening of the cross car beam, the crush can having a first side wall and an opposite second side wall, and wherein the second end wall is aligned with the second side wall and wherein the first side wall of the front energy absorbing insert is aligned with the first side wall of the crush can.

11. A product as set forth in claim 1 further comprising a cross car beam having a pocket or opening form therein, wherein the front energy absorbing insert is received in the pocket or opening, and further comprising a vehicle crush can including a top wall and a bottom wall, and wherein the top wall of the front energy absorbing insert is aligned with top wall of the crush can, and wherein the bottom wall of the front energy absorbing insert is aligned with the bottom wall of the crush can.

12. A product as set forth in claim 1 wherein the front energy absorbing insert is a single piece of continuous non-joined metal.

13. A product as set forth in claim 1 wherein the front energy absorbing insert comprises an extrusion.

14. A product as set forth in claim 1 wherein the front energy absorbing insert comprises an extruded aluminum alloy.

15. A product as set forth in claim 1 further comprising a front impact extension comprising an extrude metal and having a crushable wall align with the first side wall of the front energy absorbing insert.

* * * * *